(12) United States Patent
Ishitobi et al.

(10) Patent No.: US 11,901,721 B2
(45) Date of Patent: Feb. 13, 2024

(54) LAMINATED BUS BAR, POWER CONVERTER, POWER CONVERSION DEVICE, AND UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventors: Hidetaka Ishitobi, Chuo-ku (JP); Kenji Suzuki, Chuo-ku (JP)

(73) Assignee: TOSHIBA MITSUBISHI—ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 264 days.

(21) Appl. No.: 17/610,541

(22) PCT Filed: Mar. 17, 2020

(86) PCT No.: PCT/JP2020/011682
§ 371 (c)(1),
(2) Date: Nov. 11, 2021

(87) PCT Pub. No.: WO2021/186538
PCT Pub. Date: Sep. 23, 2021

(65) Prior Publication Data
US 2022/0216724 A1    Jul. 7, 2022

(51) Int. Cl.
*H02M 5/42* (2006.01)
*H02G 5/00* (2006.01)
(Continued)

(52) U.S. Cl.
CPC ............. *H02G 5/005* (2013.01); *H01R 25/16* (2013.01); *H02J 9/06* (2013.01); *H02M 5/4585* (2013.01);
(Continued)

(58) Field of Classification Search
CPC ........ H02M 7/003; H02G 5/005; H01R 25/16
See application file for complete search history.

(56) References Cited

U.S. PATENT DOCUMENTS

| | | | |
|---|---|---|---|
| 10,263,407 B1 * | 4/2019 | Song | B60L 50/50 |
| 11,335,649 B2 * | 5/2022 | Wang | H05K 7/14329 |
| 2017/0033593 A1 | 2/2017 | Kamizuma et al. | |

FOREIGN PATENT DOCUMENTS

| JP | WO 2017/056209 A1 | 6/2018 |
|---|---|---|
| JP | 2019-21664 A | 2/2019 |

OTHER PUBLICATIONS

Indian Office Action dated Oct. 28, 2022 in Indian Patent Application No. 202117052853, 5 pages.
(Continued)

*Primary Examiner* — Gary L Laxton
(74) *Attorney, Agent, or Firm* — Oblon, McClelland, Maier & Neustadt, L.L.P.

(57) ABSTRACT

A first AC terminal, a first positive DC terminal, and a first negative DC terminal protrude from a first end portion in the length direction of a flat plate portion of a laminated bus bar. The first AC terminal, the first positive DC terminal, and the first negative DC terminal are arranged in alignment in this order from a third end portion toward a fourth end portion in a width direction of the flat plate portion. A second AC terminal, a second positive DC terminal, and a second negative DC terminal protrude from a second end portion of the flat plate portion in the length direction. The second AC terminal, the second negative DC terminal, and the second positive DC terminal are arranged in alignment in this order from the third end portion toward the fourth end portion.

10 Claims, 11 Drawing Sheets

(51) Int. Cl.
- *H02J 9/06* (2006.01)
- *H02M 5/458* (2006.01)
- *H02M 7/00* (2006.01)
- *H01R 25/16* (2006.01)
- H02M 3/335 (2006.01)
- H02M 7/48 (2007.01)

(52) U.S. Cl.
CPC ........ *H02M 7/003* (2013.01); *H02M 3/33584* (2013.01); *H02M 5/42* (2013.01); *H02M 7/48* (2013.01)

(56) References Cited

OTHER PUBLICATIONS

International Search Report dated Jun. 30, 2020 in PCT/JP2020/011682 filed on Mar. 17, 2020, 2 pages.

\* cited by examiner

LAMINATED BUS BAR, POWER CONVERTER, POWER CONVERSION DEVICE, AND UNINTERRUPTIBLE POWER SUPPLY DEVICE

TECHNICAL FIELD

The present disclosure relates to a laminated bus bar, a power converter, a power conversion device, and an uninterruptible power supply device.

BACKGROUND ART

In a power conversion device, a laminated bus bar is frequently used in a main wiring circuit between a semiconductor module that constitute a power converter and a power supply (for example, see Japanese Patent Laying-Open No. 2019-21664 (Patent Literature 1)). The laminated bus bar has a structure in which a plurality of insulating plates are alternately stacked for a plurality of conductive plates that constitute a wiring circuit. The laminated bus bar is used for reducing wiring inductance.

CITATION LIST

Patent Literature

PTL 1: Japanese Patent Laying-Open No. 2019-21664

SUMMARY OF INVENTION

Technical Problem

In a power conversion device having a plurality of power converters, power converters having a common configuration are sometimes used for the power converters, in view of reducing production costs. For example, in a case of an uninterruptible power supply device, it has been contemplated that a converter and an inverter electrically connected in series between an AC power supply and a load are configured with common power converters.

In this case, a power converter that configures a converter and a power converter that configures an inverter are arranged in alignment on a stage. Then, two conductive members that respectively configure a DC positive bus and a DC negative bus are disposed between two power converters. A positive DC terminal and a negative DC terminal formed at a laminated bus bar of each power converter are respectively connected to two conductive members.

In the configuration above, when fuses are connected between the positive DC terminal of each power converter and the DC positive bus and between the negative DC terminal of each converter and the DC negative bus, in total, four fuses are arranged in a space between two power converters. Here, if a total of four fuses are arranged in alignment in a depth direction and a normal direction of the stage, a total of four fuses can be provided without expanding the space.

However, it is necessary to form the conductive members into a complicated shape in order to attach two fuses to one conductive member so as to be displaced from each other in a state in which two laminated bus bars having the same configuration face each other with the space interposed therebetween. With this configuration, attachment of fuses to the conductive members is difficult and, consequently, workability in installation and replacement of fuses may be reduced. In order to implement a complicated shape, the processing cost for the conductive members may be increased.

Moreover, in the arrangement of a plurality of fuses in alignment in a depth direction, a fuse on the back side is less visible, so that it may be difficult to visually check whether fuses are damaged in use of the power conversion device.

If laminated bus bars of different configurations are employed for a power converter that configures a converter and a power converter that configures an inverter, the inconvenience described above can be avoided, but this is against the purpose of achieving commonality of power converters.

The present disclosure is made in consideration of the problem above and an object of the present disclosure is to provide a laminated bus bar, a power converter, a power conversion device, and an uninterruptible power supply device, in which commonality of power converts can be achieved with a simple configuration.

Solution to Problem

A laminated bus bar according to an embodiment of the present disclosure is for use in a power converter capable of bidirectional power conversion. The laminated bus bar has a flat plate portion having a length direction, a width direction orthogonal to the length direction, and a thickness direction orthogonal to the length direction and the width direction. The flat plate portion includes a first conductive plate, a second conductive plate, a third conductive plate, and first to fourth insulating plates. The first conductive plate has a first AC terminal and a second AC terminal. The second conductive plate has a first positive DC terminal and a second positive DC terminal. The third conductive plate has a first negative DC terminal and a second negative DC terminal. The first to fourth insulating plates are alternately stacked in the thickness direction for the first to third conductive plates. The flat plate portion has a first end portion in the length direction of the flat plate portion and a second end portion on an opposite side to the first end portion of the flat plate portion. In the first end portion, the first AC terminal protrudes from the first conductive plate in the length direction. The first positive DC terminal protrudes from the second conductive plate in the length direction. The first negative DC terminal protrudes from the third conductive plate in the length direction. The first AC terminal, the first positive DC terminal, and the first negative DC terminal are arranged in alignment in this order from a third end portion in the width direction of the flat plate portion toward a fourth end portion on an opposite side to the third end portion. In the second end portion, the second AC terminal protrudes from the first conductive plate in the length direction. The second positive DC terminal protrudes from the second conductive plate in the length direction. The second negative DC terminal protrudes from the third conductive plate in the length direction. The second AC terminal, the second negative DC terminal, and the second positive DC terminal are arranged in alignment in this order from the third end portion toward the fourth end portion of the flat plate portion.

Advantageous Effects of Invention

The present disclosure can provide a laminated bus bar, a power converter, a power conversion device, and an uninterruptible power supply device, in which commonality of power converts can be achieved with a simple configuration.

DESCRIPTION OF EMBODIMENTS

Figure 1:
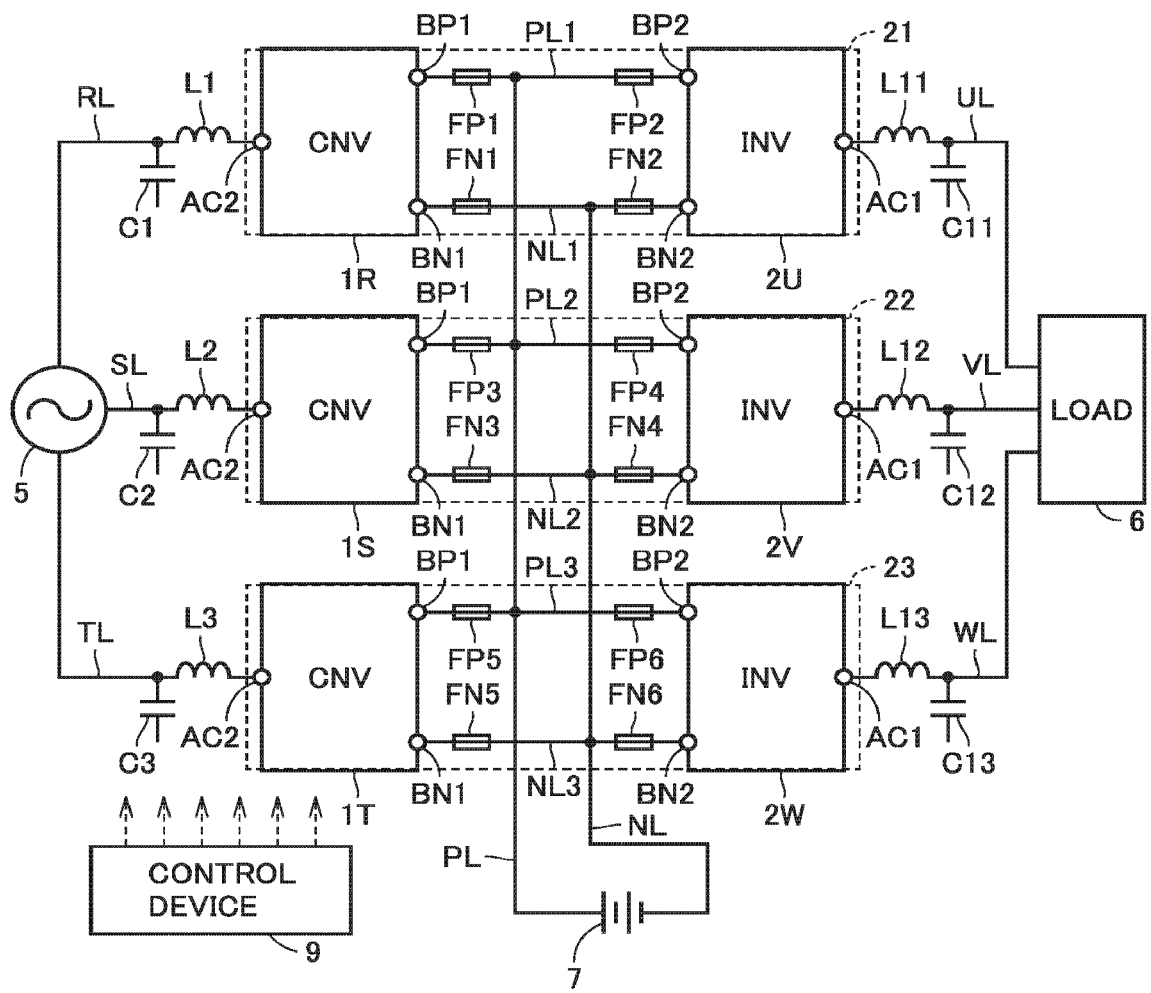
FIG. 1 is a block diagram showing a main circuit configuration of a power conversion device according to an embodiment.

Embodiments of the present invention will be described in detail below with reference to the drawings. In the following, the same or corresponding parts in the drawings are denoted by the same reference signs and a description thereof will basically not be repeated.

(Main Circuit Configuration of Power Conversion Device)

FIG. 1 is a block diagram illustrating a main circuit configuration of a power conversion device according to an embodiment. The power conversion device according to the present embodiment is typically applicable to an uninterruptible power supply device 100.

Referring to FIG. 1, uninterruptible power supply device 100 is connected between a commercial AC power supply 5 and a load 6. Commercial AC power supply 5 supplies three-phase AC power to uninterruptible power supply device 100. Uninterruptible power supply device 100 supplies three-phase AC power to load 6.

Specifically, commercial AC power supply 5 supplies three-phase AC voltages VR, VS, and VT having a commercial frequency to uninterruptible power supply device 100 through an R-phase line RL, an S-phase line SL, and a T-phase line TL. Uninterruptible power supply device 100 receives three-phase AC voltages VR, VS, and VT from commercial AC power supply 5 and outputs three-phase AC voltages VU, VV, and VW having a commercial frequency to load 6 through a U-phase line UL, a V-phase line VL, and a W-phase line WL.

Uninterruptible power supply device 100 includes reactors L1 to L3 and L11 to L13, capacitors C1 to C3 and C11 to C13, power conversion units 21 to 23, a DC positive bus PL, a DC negative bus NL, a battery 7, and a control device 9.

Reactors L1 to L3 and capacitors C1 to C3 constitute a three-phase LC filter circuit. This LC filter circuit is a low-pass filter and functions as an input filter for preventing harmonics from flowing to commercial AC power supply 5.

Reactors L11 to L13 and capacitors C11 to C13 constitute a three-phase LC filter circuit. This LC filter circuit is a low-pass filter and functions as an output filter for preventing harmonics from flowing to load 6.

Power conversion units 21 to 23 convert three-phase AC voltages VR, VS, and VT supplied from commercial AC power supply 5 through the input filter into DC voltage and converts the DC voltage into three-phase AC voltages VU, VV, and VW. Power conversion units 21 to 23 supply three-phase AC voltages VU, VV, and VW to load 6 through the output filter.

Specifically, power conversion unit 21 has a converter 1R, DC buses PL1 and NL1, an inverter 2U, and fuses FP1, FP2, FN1, and FN2. Power conversion unit 22 has a converter 1S, DC buses PL2 and NL2, an inverter 2V, and fuses FP3, FP4, FN3, and FN4. Power conversion unit 23 has a converter 1T, DC buses PL3 and NL3, an inverter 2WV, and fuses FP5, FP6, FN5, and FN6.

Each of converters 1R, 1S, and 1T has an AC terminal AC2, a positive DC terminal (that is, high potential-side DC terminal) BP1 and a negative DC terminal (that is, low potential-side DC terminal) BN1. Each of inverters 2U, 2V, and 2W has an AC terminal AC1, a positive DC terminal BP2, and a negative DC terminal BN2. Converters 1R, 1S, and 1T and inverters 2U, 2V, and 2W correspond to an embodiment of "power converter". Converters 1R, 1S, and 1T correspond to an embodiment of "first power converter". Inverters 2U, 2V, and 2W correspond to an embodiment of "second power converter".

AC terminal AC2 of converter 1R receives R-phase voltage VU from R-phase line RL through the input filter (capacitor C1 and reactor L1). Converter 1R converts R-phase voltage VR into DC voltage and outputs the DC voltage to between DC terminals BP1 and BN1.

AC terminal AC2 of converter 1S receives S-phase voltage VS from S-phase line SL through the input filter (capacitor C2 and reactor L2). Converter 1S converts S-phase voltage VS into DC voltage and outputs the DC voltage to between DC terminals BP1 and BN1.

AC terminal AC2 of converter 1T receives T-phase voltage VT from T-phase line RL through the input filter (capacitor C3 and reactor L3). Converter 1T converts T-phase voltage VT into DC voltage and outputs the DC voltage to between DC terminals BP1 and BN1.

One terminal of each of fuses FP1, FP3, and FP5 is connected to positive DC terminal BP1 of the corresponding one of converters 1R, 1S, and 1T. The other terminals of fuses FP1, FP3, and FP5 are respectively connected to DC positive buses PL1 to PL3.

One terminal of each of fuses FN1, FN3, and FN5 is connected to negative DC terminal BN1 of the corresponding one of converters 1R, 1S, and 1T. The other terminals of fuses FN1, FN3, and FN5 are respectively connected to DC negative buses NL1 to NL3.

One terminal of each of fuses FP2, FP4, and FP6 is connected to the corresponding one of DC positive buses PL1 to PL3. The other terminals of fuses FP2, FP4, and FP6 are respectively connected to positive DC terminals BP2 of inverters 2U, 2V, and 2W.

One terminal of each of fuses FN2, FN4, and FN6 is connected to the corresponding one of DC negative buses NL1 to NL3. The other terminals of fuses FN2, FN4, and FN6 are respectively connected to negative DC terminals BN2 of inverters 2U, 2V, and 2W.

DC terminals BP2 and BN2 of inverter 2U receive DC voltage from converter 1R through DC buses PL1 and NL1. Inverter 2U converts DC voltage into U-phase voltage VU and outputs the U-phase voltage VU to AC terminal AC1.

DC terminals BP2 and BN2 of inverter 2V receive DC voltage from converter 1S through DC buses PL2 and NL2. Inverter 2V converts DC voltage into V-phase voltage VV and outputs the V-phase voltage VV to AC terminal AC1.

DC terminals BP2 and BN2 of inverter 2W receive DC voltage from converter 1T through DC buses PL3 and NL3. Inverter 2W converts DC voltage into W-phase voltage VW and outputs the W-phase voltage VW to AC terminal AC1.

DC positive bus PL is connected to DC positive buses PL1 to PL3. DC negative bus NL is connected to DC negative buses NL1 to NL3. DC buses PL and NL receive DC voltage generated in converters 1R, 1S, and 1T. Battery 7 is connected between DC positive bus PL and DC negative bus NL. Battery 7 corresponds to an embodiment of "power storage device".

Control device 9 controls converters 1R, 1S, and 1T and inverters 2U, 2V, and 2W in order to generate AC power to be supplied to load 6 in a sound state and a power failure of commercial AC power supply 5. Control device 9 is mainly configured as, for example, a microcomputer including a CPU (Central Processing Unit) and a storage unit such as a ROM (Read Only Memory) and a RAM (Random Access Memory). Control device 9 controls converters 1R, 1S, and 1T and inverters 2U, 2V, and 2W by the CPU reading a program stored in advance in the ROM into the RAM and executing the program.

Specifically, in a sound state of commercial AC power supply 5, control device 9 controls converters 1R, 1S, and 1T and inverters 2U, 2V, and 2W such that three-phase AC voltages VR, VS, and VT applied from commercial AC power supply 5 to AC terminal AC2 are converted into DC voltage, the DC voltage is supplied to battery 7, and the DC voltage is converted into three-phase AC voltages VU, VV, and VW and output to AC terminal AC1.

On the other hand, in a power failure of commercial AC power supply 5, control device 9 stops the operation of converters 1R, 1S, and 1T and controls inverters 2U, 2V, and 2W such that DC voltage generated by DC power applied from battery 7 to DC terminals BP2 and BN2 is converted into three-phase AC voltages VU, VV, and VW and output to AC terminal AC1.

(Circuit Configuration of Power Converter)

In uninterruptible power supply device 100 shown in FIG. 1, power converters having a common structure can be used for converters 1R, 1S, 1T and inverters 2U, 2V, 2W.

Hereinafter, the structure of a converter according to the present embodiment will be described in detail. First, referring to FIG. 2 to FIG. 4, a circuit configuration of the power converter according to the present embodiment is described.

Figure 2:
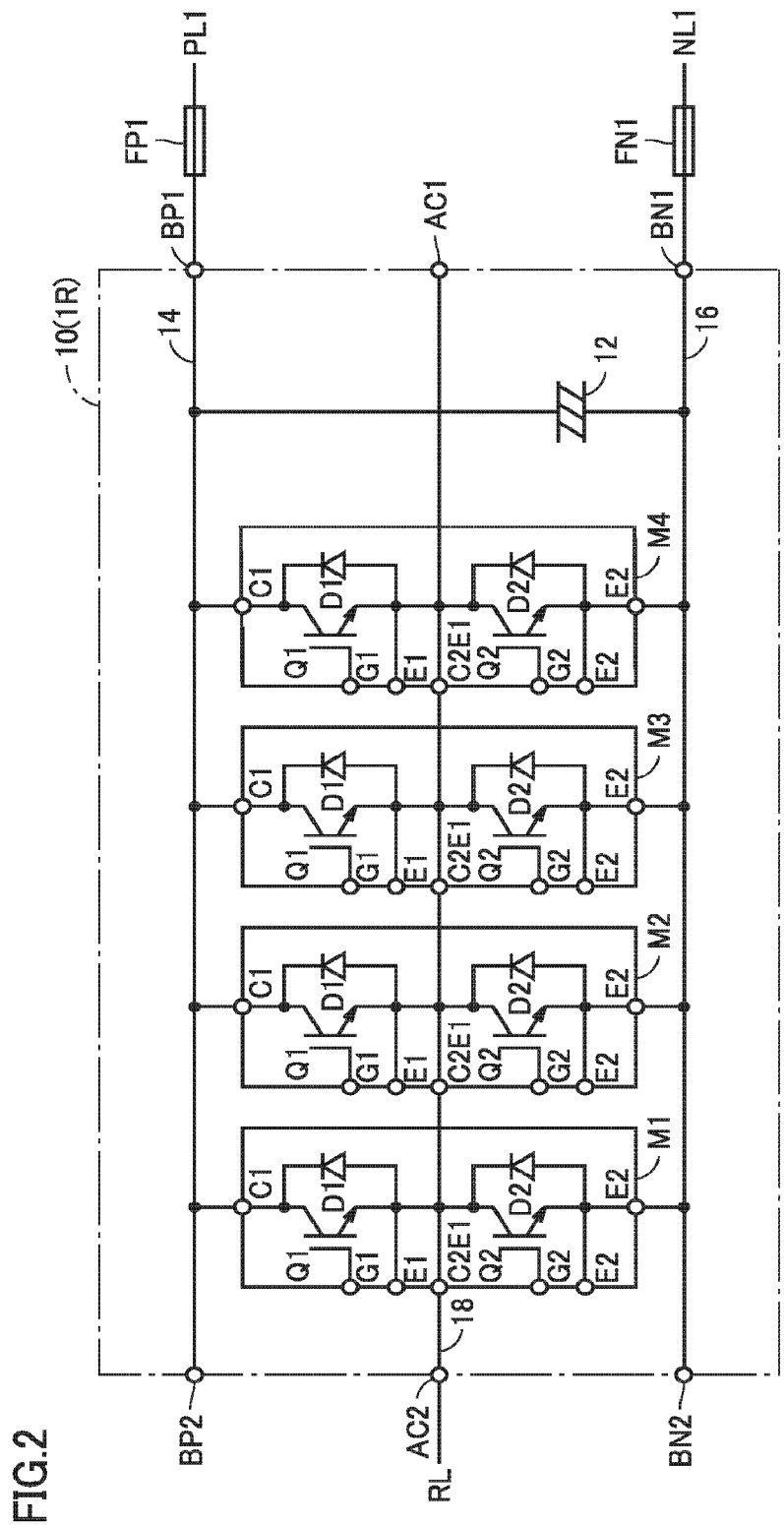
FIG. 2 is a block diagram showing a circuit configuration of a power converter according to the embodiment.
Figure 3:
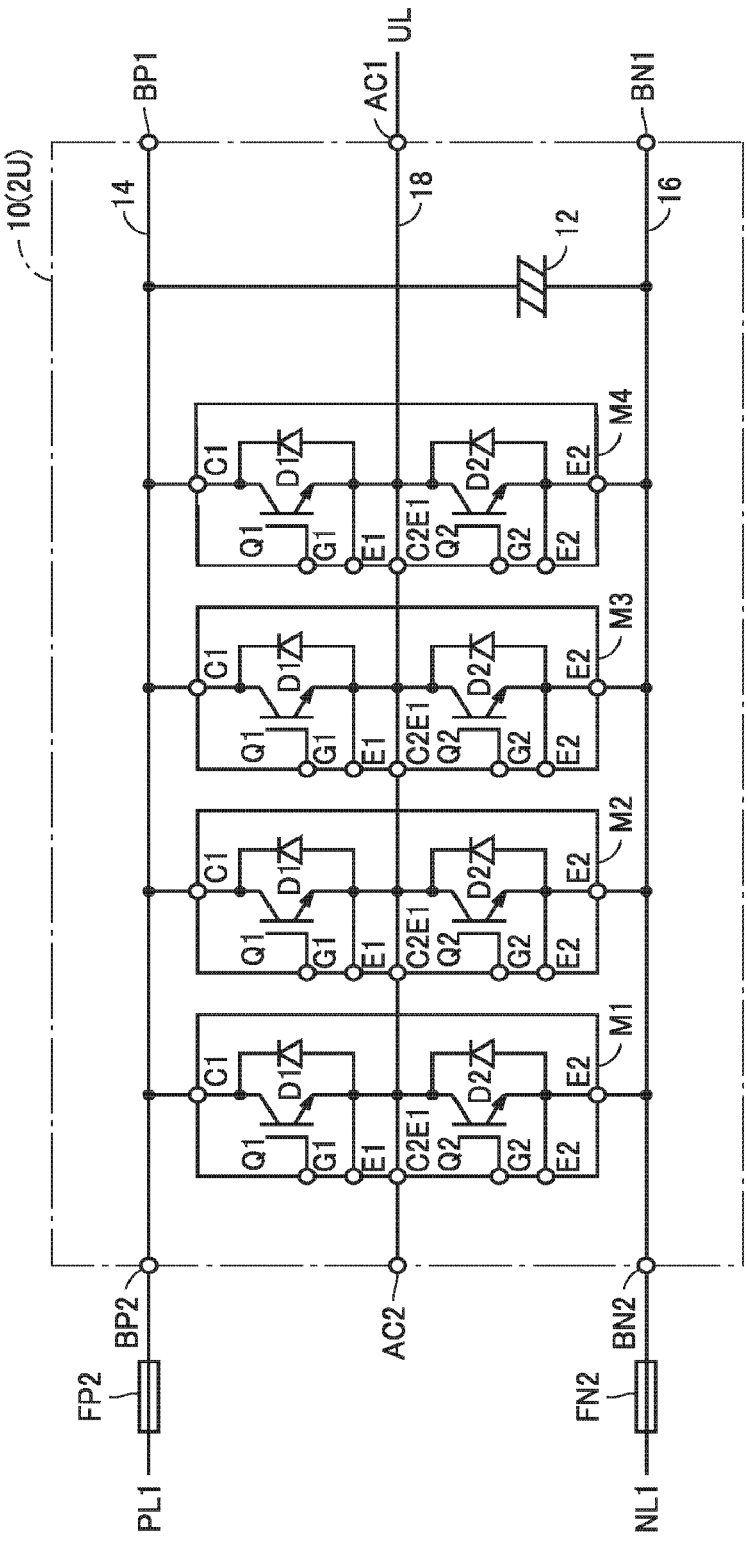
FIG. 3 is a block diagram showing a circuit configuration of a power converter according to the embodiment.

FIG. 2 and FIG. 3 are block diagrams showing a circuit configuration of power converter 10 according to the present embodiment. FIG. 2 shows a configuration example of converter 1R using power converter 10.

Referring to FIG. 2, power converter 10 includes AC terminals AC1 and AC2, positive DC terminals BP1 and BP2, and negative DC terminals BN1 and BN2.

AC input terminals AC1 and AC2 receive AC voltage from commercial AC power supply 5 or load 6. In the example of converter 1R, AC terminal AC2 is connected to R-phase line RL and receives R-phase voltage VR from commercial AC power supply 5. AC terminal AC2 corresponds to an embodiment of "second AC terminal".

Positive DC terminals BP1 and BP2 are connected to one terminal of fuse FP. Negative DC terminals BN1 and BN2 are connected to one terminal of fuse FN. In the example of converter 1R in FIG. 2, positive DC terminal BP1 is connected to one terminal of fuse FP1, and negative DC terminal BN1 is connected to one terminal of fuse FN1. Positive DC terminal BP1 corresponds to an embodiment of "first positive DC terminal", and positive DC terminal BP2 corresponds to an embodiment of "second positive DC terminal". Negative DC terminal BN1 corresponds to an embodiment of "first negative DC terminal", and negative DC terminal BN2 corresponds to an embodiment of "second negative DC terminal".

Power converter 10 further includes DC lines 14 and 16, an AC line 18, a plurality of semiconductor modules M1 to M4, and a capacitor 12.

DC line 14 is connected between positive DC terminal BP1 and positive DC terminal BP2. DC line 16 is connected between negative DC terminal BN1 and negative DC terminal BN2. AC line 18 is connected between AC terminal AC1 and AC terminal AC2.

A plurality of semiconductor modules M1 to M4 are connected in parallel with each other between DC line 14 and DC line 16. Hereinafter, semiconductor modules M1 to M4 may be collectively referred to as semiconductor module M. The number of semiconductor modules M is not limited to four and can be changed to any number including one.

Semiconductor module M has semiconductor switching elements Q1 and Q2, diodes D1 and D2, a collector terminal C1, an emitter terminal E2, a collector-emitter terminal C2E1, and control terminals G1, G2, E1, and E2. Each of semiconductor switching elements Q1 and Q2 is, for example, an IGBT (Insulated Gate Bipolar Transistor). IGBT Q1 has the collector connected to collector terminal C1 and has the emitter connected to the collector of IGBT Q2, control terminal E1, and collector-emitter terminal C2E1. IGBT Q1 has the gate connected to control terminal G1. IGBT Q2 has the emitter connected to emitter terminal E2 and control terminal E2 and has the gate connected to control terminal G2. Diode D1 is connected in anti-parallel with IGBT Q1, and diode D2 is connected in anti-parallel with IGBT Q2.

Semiconductor module M has collector terminal C1 connected to DC line 14 and emitter terminal E2 connected to DC line 16. Semiconductor module M has collector-emitter terminal C2E1 connected to AC line 18.

Capacitor 12 has the positive electrode connected to DC line 14 and the negative electrode connected to DC line 16. Capacitor 12 has a plurality of capacitor units CD connected in parallel, as described later.

FIG. 3 shows a configuration example of inverter 2U using power converter 10. The configuration example shown in FIG. 3 differs from the configuration example shown in FIG. 2 only in the connection of DC buses PL1 and NL1 and the AC line. In the example of inverter 2U, AC terminal AC1 is connected to U-phase line UL and outputs U-phase voltage VU. AC terminal AC1 corresponds to an embodiment of "first AC terminal". Positive DC terminal BP2 is connected to one terminal of fuse FP2, and negative DC terminal BN2 is connected to one terminal of fuse FN2.

Figure 4:
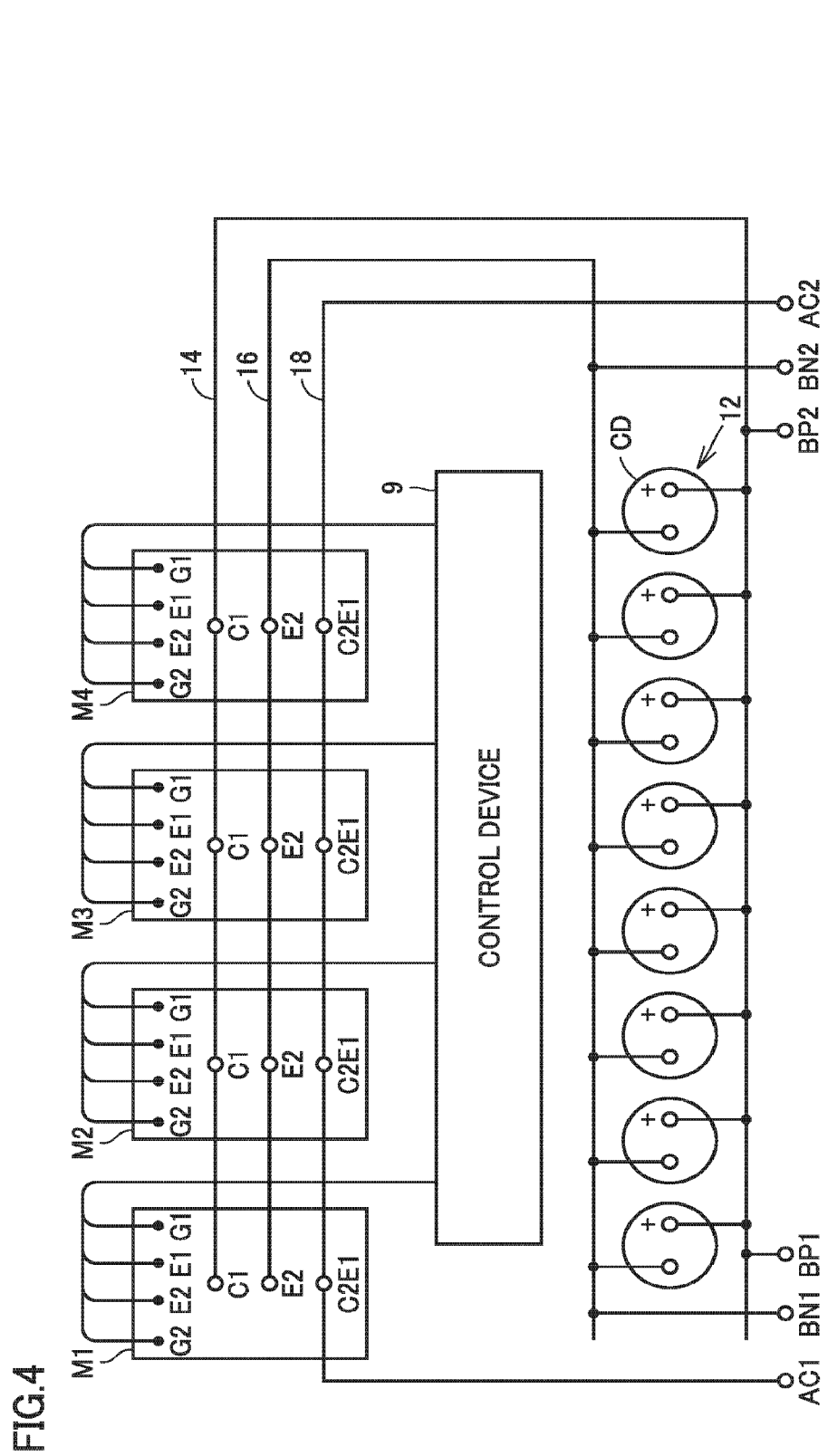
FIG. 4 is a diagram schematically showing a connection relation between the power converter and a control device according to the embodiment.

FIG. 4 is a diagram schematically showing a connection relation between power converter 10 and control device 9 according to the present embodiment.

Referring to FIG. 4, control terminals G1, G2, E1, and E2 of each semiconductor module M are connected to control device 9. Each semiconductor module M has collector terminal C1 connected to DC line 14, emitter terminal E2 connected to DC line 16, and collector-emitter terminal C2E1 connected to AC line 18.

A plurality of capacitor units CD that constitute capacitor 12 are connected in parallel between DC line 14 and DC line 16. The number of capacitor units CD can be changed as desired.

Positive DC terminals BP1 and BP2 are drawn from DC line 14 to the outside of power converter 10. Negative DC terminals BN1 and BN2 are drawn from DC line 16 to the outside of power converter 10. AC terminals AC1 and AC2 are drawn from AC line 18 to the outside of power converter 10.

As described above, converter 1R and inverter 2U can be implemented using power converters 10 having a common configuration by changing the connection of wiring. The commonality of components enhances the productivity of power conversion devices and consequently can reduce the production cost. In addition, the repair and/or replacement of failed components, if any, is facilitated and therefore the cost for maintenance of the power conversion device can be reduced.

(Configuration Example of Power Conversion Device)

A configuration example of power converter 10 and a power conversion device (uninterruptible power supply device 100) equipped with power converters 10 according to the present embodiment will now be described.

Figure 5:
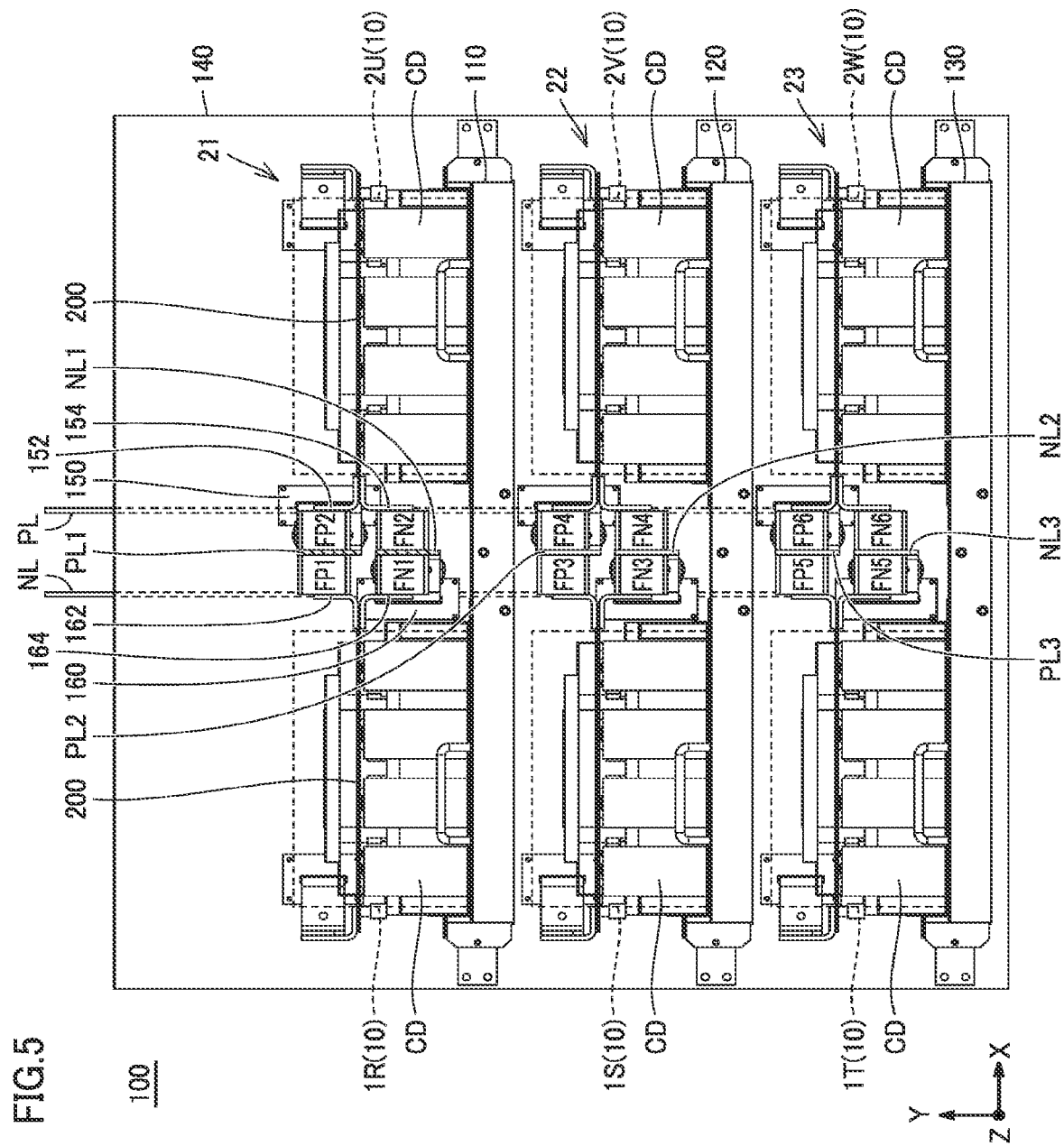
FIG. 5 is a front view of an uninterruptible power supply device according to the embodiment.
Figure 6:
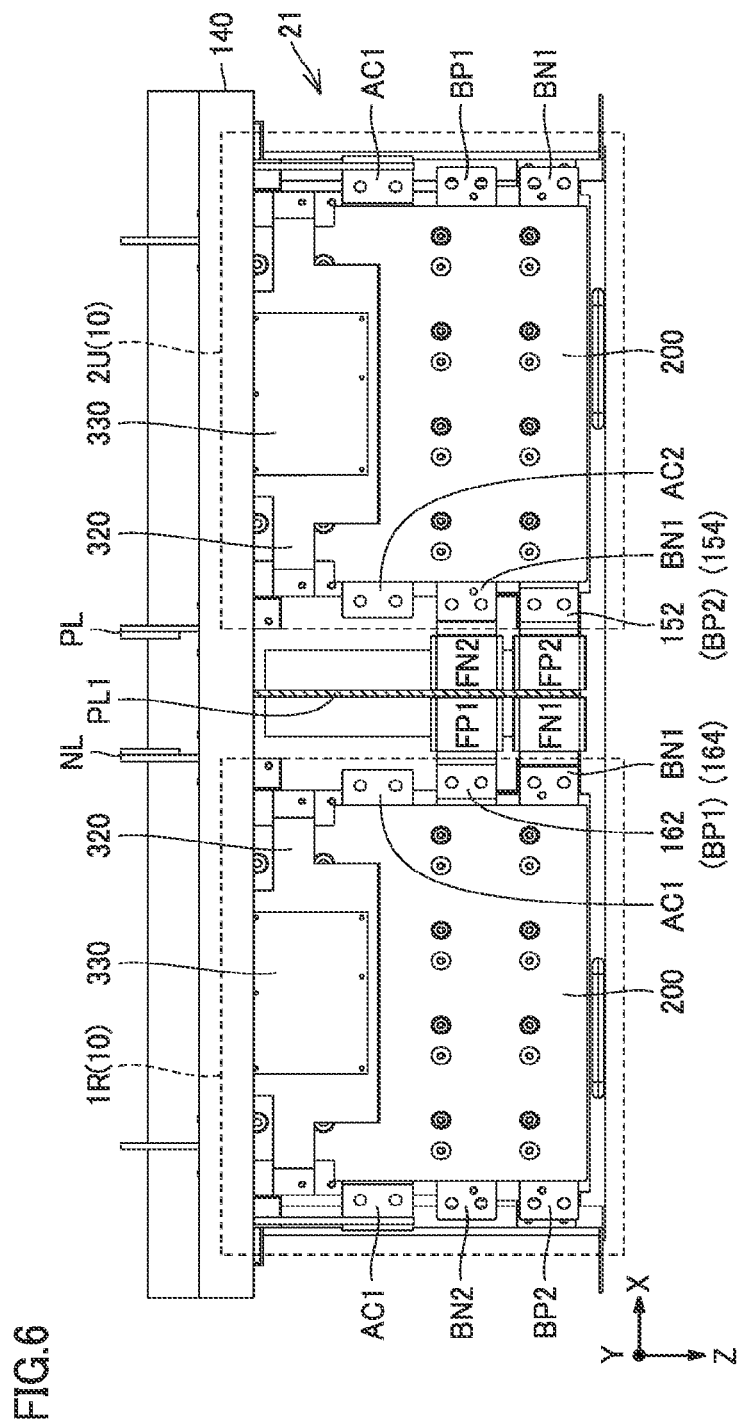
FIG. 6 is a top view of the uninterruptible power supply device according to the embodiment.

FIG. 5 is a front view of uninterruptible power supply device 100 according to the present embodiment. FIG. 6 is a top view of uninterruptible power supply device 100 according to the present embodiment. In the following description, the right-left direction (or length direction) is X direction, the front-back direction (or width direction) is Z direction, and the top-bottom direction (or thickness direction) is Y direction.

FIG. 5 and FIG. 6 specifically show the portion related to the power conversion device according to the present embodiment. The components of uninterruptible power supply device 100, including the power conversion device shown in FIG. 5 and FIG. 6, are accommodated in a not-shown board-shaped (rectangular parallelepiped shaped) casing.

Referring to FIG. 5, uninterruptible power supply device 100 further includes stages 110, 120, and 130, and a partition plate 140. Uninterruptible power supply device 100 is formed by stacking stages 110, 120, and 130 provided with power conversion units 21 to 23, respectively, in the top-bottom direction (Y direction). In the example in FIG. 5, power conversion unit 23 is mounted on stage 130 on the bottom layer, power conversion unit 22 is mounted on stage 120 on the middle layer, and power conversion unit 21 is mounted on stage 110 on the top layer. FIG. 6 shows a plan view of power conversion unit 21 on the top layer.

Partition plate 140 has a rectangular flat plate-like shape and is installed upright on the bottom surface of the casing of uninterruptible power supply device 100. Partition plate 140 has a first surface vertical to the Z direction and a second surface on the opposite side to the first surface. Stages 110, 120, and 130 are fixed to the first surface of partition plate 140. DC positive bus PL and DC negative bus NL are conductive members having a strip-like shape. The conductive members are arranged to extend in the Y direction on the second surface side of partition plate 140. Partition plate 140 has through holes 150 and 160.

Each of stages 110, 120, and 130 has a rectangular flat plate-like shape and has a first surface and a second surface on the opposite side to the first surface. Converter 1R and inverter 2U are arranged in alignment in the length direction (X direction) on the first surface of stage 110. DC buses PL1 and NL1 and fuses FP1, FP2, FN1, and FN2 are arranged in a space between converter 1R and inverter 2U.

Converter 1S and inverter 2V are arranged in alignment in the length direction (X direction) on the first surface of stage 120. DC buses PL2 and NL2 and fuses FP3, FP4, FN3, and FN2 are arranged in a space between converter 1S and inverter 2V.

Converter 1T and inverter 2W are arranged in alignment in the length direction (X direction) on the first surface of stage 130. DC buses PL3 and NL3 and fuses FP5, FP6, FN5, and FN6 are arranged in a space between converter 1T and inverter 2W.

One-end portions of DC positive buses PL1, PL2, and PL3 are connected to DC positive bus PL through through holes 150 formed in partition plate 140. One-end portions of DC negative buses NL1, NL2, and NL3 are connected to DC negative bus NL through through holes 160 formed in partition plate 140.

Figure 7:
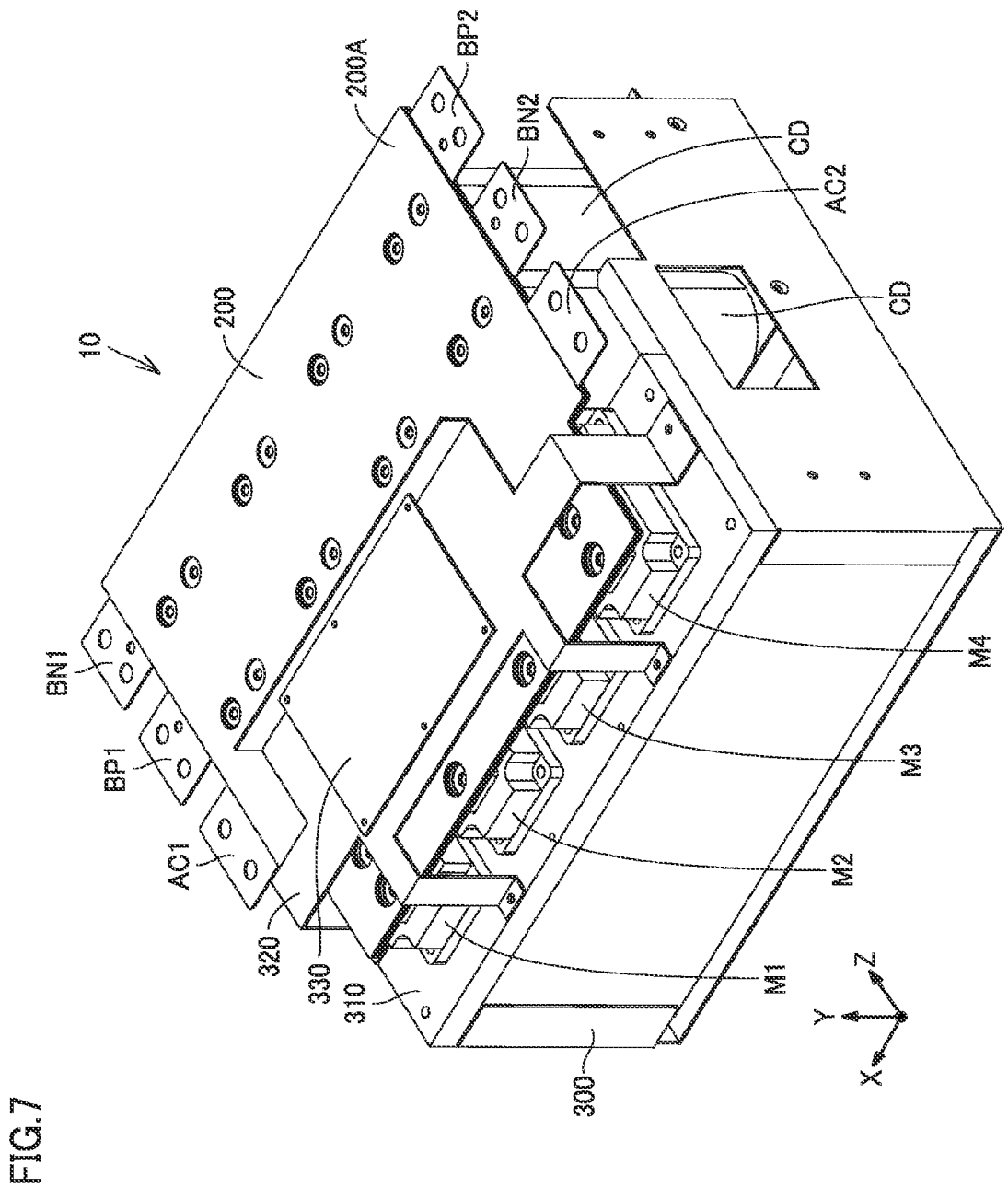
FIG. 7 is an external perspective view of the power converter.

As described above, converters 1R, 1S, and 1T and inverters 2U, 2V, and 2W are configured with common power converters 10. FIG. 7 is an external perspective view of power converter 10.

Referring to FIG. 7, power converter 10 has a plurality of semiconductor modules M1 to M4, a plurality of capacitor units CD, a laminated bus bar 200, a casing 300, substrates 310 and 330, and a cover 320.

Casing 300 has a rectangular parallelepiped shape and its top surface is open. An opening for introducing cooling air into casing 300 is formed on one-side surface in the Z direction of casing 300.

First substrate 310 is attached to the top surface of casing 300. First substrate 310 has a rectangular flat plate-like shape. First substrate 310 has a first surface facing the bottom surface of casing 300 and a second surface on the opposite side to the first surface. A not-shown heatsink is fixed to the first surface. The heat sink has a base fixed to the first surface and fins protruding from the base. The heatsink is formed of, for example, a metal having a high thermal conductivity, such as aluminum or copper.

A plurality of semiconductor modules M1 to M4 are arranged in alignment in the length direction (X direction) on the second surface of first substrate 310. However, the arrangement of a plurality of semiconductor modules M1 to M4 is not limited to this.

As shown in FIG. 2 and FIG. 3, semiconductor module M has semiconductor switching elements Q1 and Q2, diodes D1 and D2, collector terminal C1, emitter terminal E2, collector-emitter terminal C2E1, and control terminals G1, G2, E1, and E2. Semiconductor module M has a configuration, for example, in which semiconductor switching elements Q1 and Q2 and diodes D1 and D2 are mounted on a flat plate-like substrate. Semiconductor switching elements Q1 and Q2 and diodes D1 and D2 are electrically connected by bonding wires or wiring layers. Semiconductor switching elements Q1 and Q2 and diodes D1 and D2 are sealed by resin together with the substrate, the bonding wires, the wiring layers, and the like. The resin is formed in a substantially rectangular shape. Collector terminal C1, emitter terminal E2, and collector-emitter terminal C2E1 are arranged so as to protrude in parallel to each other from the surface of the substantially rectangular-shaped resin. Collector terminal C1, emitter terminal E2, and collector-emitter terminal C2E1 are connected to laminated bus bar 200, whereby semiconductor module M is mounted on laminated bus bar 200.

A plurality of capacitor units CD are accommodated in the inside of casing 300. A plurality of capacitor units CD are arranged in alignment upright on the bottom surface of casing 300. A plurality of capacitor units CD constitute capacitor 12 shown in FIG. 2 and FIG. 3. Capacitor unit CD has a cylindrical portion and a positive electrode terminal and a negative electrode terminal provided at one end of the cylindrical portion. The positive electrode terminal and the negative electrode terminal are connected to laminated bus bar 200, whereby capacitor CD is mounted on laminated bus bar 200.

A plurality of semiconductor modules M and a plurality of capacitors CD are electrically connected through laminated bus bar 200. Laminated bus bar 200 forms DC lines 14 and 16 and AC line 18 (see FIG. 2 to FIG. 4).

Laminated bus bar 200 has a substantially rectangular flat plate-like shape and is arranged to face the bottom surface of casing 300. Laminated bus bar 200 has a first surface 200A and a second surface 200B on the opposite side to first surface 200A. Second surface 200B faces the bottom surface of casing 300. A cover 320 covering a part of first surface 200A is arranged above first surface 200A in the thickness direction (Y direction). Second substrate 330 is arranged on cover 320. The not-shown control device 9 (see FIG. 1) and the like are mounted on second substrate 330.

Figure 8:
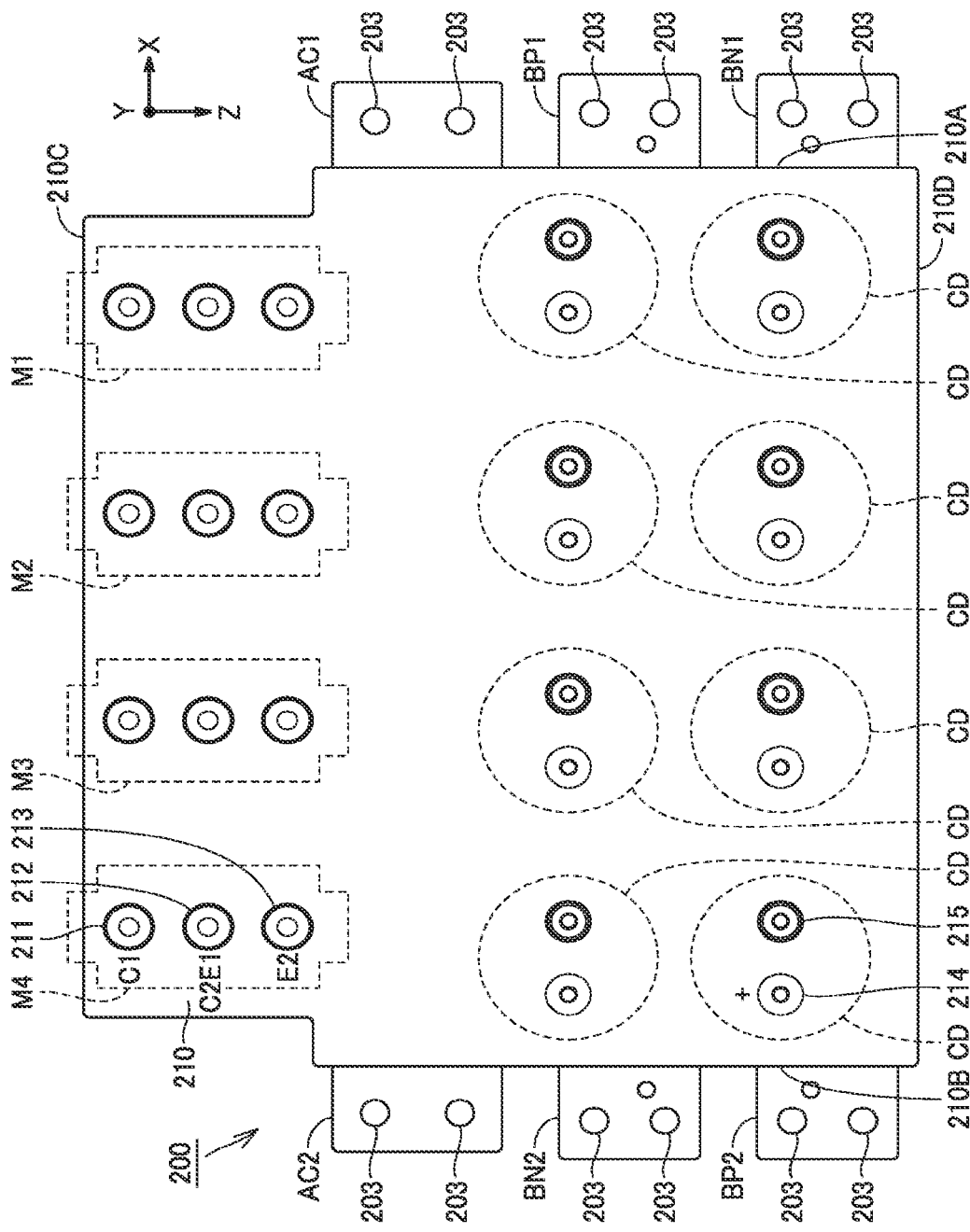
FIG. 8 is a plan view showing a configuration of a laminated bus bar.

FIG. 8 is a plan view showing a configuration of laminated bus bar 200.

Referring to FIG. 8, laminated bus bar 200 has a flat plate portion 210, AC terminals AC1 and AC2, positive DC terminals BP1 and BP2, and negative DC terminals BN1 and BN2.

Flat plate portion 210 has a length direction (X direction), a width direction (Z direction) orthogonal to the length direction, and a thickness direction (Y direction) orthogonal to the length direction and the width direction. Flat plate portion 210 has a plurality of through holes 211 to 215 passing through in the thickness direction. Through hole 211 (second through hole) is arranged at a position corresponding to collector terminal C1 of semiconductor module M. Through hole 212 (first through hole) is arranged at a position corresponding to collector-emitter terminal C2E1 of semiconductor module M. Through hole 213 (third through hole) is arranged at a position corresponding to emitter terminal E2 of semiconductor module M. Through hole 214 (fourth through hole) is arranged at a position corresponding to the positive electrode terminal of capacitor unit CD. Through hole 215 (fifth through hole) is arranged at a position corresponding to the negative electrode terminal of capacitor unit CD. A not-shown connection terminal (for example, bolt) is inserted in each through hole. With this connection terminal, each of collector terminal C1, collector-emitter terminal C2E1, and emitter terminal E2 of semiconductor module M, and the positive electrode terminal and the negative electrode terminal of capacitor unit CD can be electrically connected at a predetermined position to laminated bus bar 200.

Figure 9:
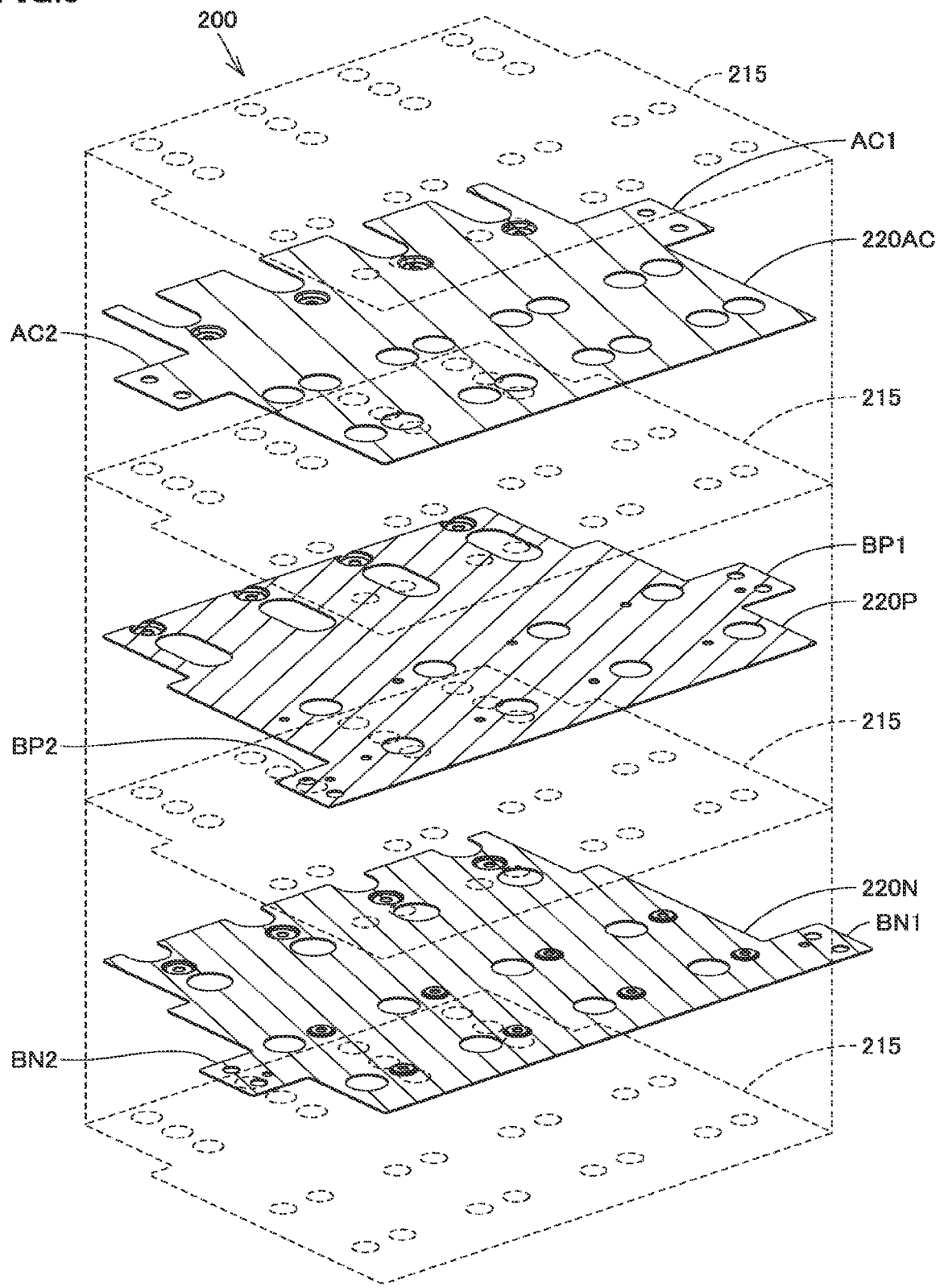
FIG. 9 is an exploded perspective view of a flat plate portion of the laminated bus bar.

FIG. 9 is an exploded perspective view of flat plate portion 210 of laminated bus bar 200. Referring to FIG. 9, flat plate portion 210 has a first conductive plate 220AC, a second conductive plate 220P, a third conductive plate 220N, and first to fourth insulating plates 215. First to fourth insulating plates 215 and first to third conductive plates 220AC, 220P, and 220C are alternately stacked to form a stack. Specifically, the stack includes fourth insulating plate 215, third conductive plate 220N, third insulating plate 215, second conductive plate 220P, second insulating plate 215, first conductive plate 220AC, and first insulating plate 215 stacked in this order from below.

First AC terminal AC1 and second AC terminal AC2 are formed at first conductive plate 220AC. First conductive plate 220AC forms AC line 18 (see FIG. 2 to FIG. 4).

First positive DC terminal BP1 and second positive DC terminal BP2 are formed at second conductive plate 220P. Second conductive plate 220P forms DC line 14 (see FIG. 2 to FIG. 4).

First negative DC terminal BN1 and second negative DC terminal BN2 are formed at third conductive plate 220N. Third conductive plate 220N forms DC line 16 (see FIG. 2 to FIG. 4).

As shown in FIG. 8, in a first end portion 210A in the length direction (X direction) of flat plate portion 210, first AC terminal AC1 protrudes from first conductive plate 220AC in the length direction. First positive DC terminal BP1 protrudes from second conductive plate 220P in the length direction. First negative DC terminal BN1 protrudes from third conductive plate 220N in the length direction. Each of first AC terminal AC1, first positive DC terminal BP1, and first negative DC terminal BN1 has a rectangular flat plate-like shape and has a connection hole 203 formed by drilling.

In a second end portion 210B in the length direction of flat plate portion 210, second AC terminal AC2 protrudes from first conductive plate 220AC in the length direction. Second positive DC terminal BP2 protrudes from second conductive plate 220P in the length direction. Second negative DC terminal BN2 protrudes from third conductive plate 220N in the length direction. Each of second AC terminal AC2, second positive DC terminal BP2, and second negative DC terminal BN2 has a rectangular flat plate-like shape and has a connection hole 203 formed by drilling.

First AC terminal AC1, first positive DC terminal BP1, and first negative DC terminal BN1 are arranged in alignment in this order from a third end portion 210C in the width direction of flat plate portion 210 toward a fourth end portion 210D on the opposite side to third end portion 210C. On the other hand, second AC terminal AC2, second negative DC terminal BN2, and second positive DC terminal BP2 are arranged in alignment in this order from third end portion 210C in the width direction of flat plate portion 210 toward fourth end portion 210D.

Furthermore, in the example in FIG. 8, first AC terminal AC1 and second AC terminal AC2 are arranged at positions facing each other in the length direction with flat plate portion 210 interposed therebetween. First positive DC terminal BP1 and second negative DC terminal BN2 are arranged at positions facing each other in the length direction with flat plate portion 210 interposed therebetween. First negative DC terminal BN1 and second positive DC terminal BP2 are arranged at positions facing each other in the length direction with flat plate portion 210 interposed therebetween. That is, the order in which positive DC terminal BP and negative DC terminal BN are arranged is opposite between first end portion 210A and second end portion 210B of laminated bus bar 200.

In power conversion unit 21 shown in FIG. 6, first power converter 10 (converter 1R) and second power converter 10 (inverter 2U) are arranged in alignment in the length direction (X direction). Specifically, first end portion 210A of laminated bus bar 200 of first power converter 10 and second end portion 210B of laminated bus bar 200 of second power converter 10 face each other in the length direction (X direction), and fourth end portions 210D of laminated bus bars 200 are arranged in the width direction so as to be aligned in the length direction, In the case of the arrangement as shown in FIG. 6, first positive DC terminal BP1 of first power converter 10 and second negative DC terminal BN2 of second power converter 10 are arranged to face each other. First negative DC terminal BN1 of first power converter 10 and second positive DC terminal BP2 of second power converter 10 are arranged to face each other.

As shown in FIG. 5 and FIG. 6, four fuses FP1, FP2, FN1, and FN2 are arranged between first power converter 10 and second power converter 10. Each fuse has a substantially rectangular parallelepiped shape. Each fuse has a first terminal and a second terminal.

The first terminal of first fuse FP1 is connected to first positive DC terminal BP1 of first power converter 10 (converter 1R) through a connection member 162. The second terminal of first fuse FP1 is connected to a first surface of DC positive bus PL1 having a strip-like shape.

The first terminal of second fuse FP2 is connected to second positive DC terminal BP2 of second power converter 10 (inverter 2U) through a connection member 152. The second terminal of second fuse FP2 is connected to a second surface on the opposite side to the first surface of DC positive bus PL1.

The first terminal of third fuse FN1 is connected to first negative DC terminal BN1 of first power converter 10 (converter 1R) through a connection member 164. The second terminal of third fuse FN1 is connected to a first surface of DC negative bus NL1 having a strip-like shape.

The first terminal of fourth fuse FN2 is connected to second negative DC terminal BN2 of second power converter 10 (inverter 2U) through a connection member 154. The second terminal of fourth fuse FN2 is connected to a second surface on the opposite side to the first surface of DC negative bus NL1.

Each of connection members 152, 154, 162, and 164 is formed by bending the conductive member having a strip-like shape, substantially at right angle. Connection terminals such as bolts can be used for connection between the first terminal of each fuse and the connection member and connection between the second terminal of each fuse and the DC bus.

As shown in FIG. 5, in a two-dimensional view as viewed from the width direction (Z direction), first fuse FP1 and second fuse FP2 are arranged in alignment in the length direction (X direction). Third fuse FN1 and fourth fuse FN2 are arranged in alignment in the length direction. Third fuse FN1 is arranged in alignment with first fuse FP1 in the thickness direction (Y direction). Fourth fuse FN2 is arranged in alignment with second fuse FN2 in the thickness direction.

Figure 10:
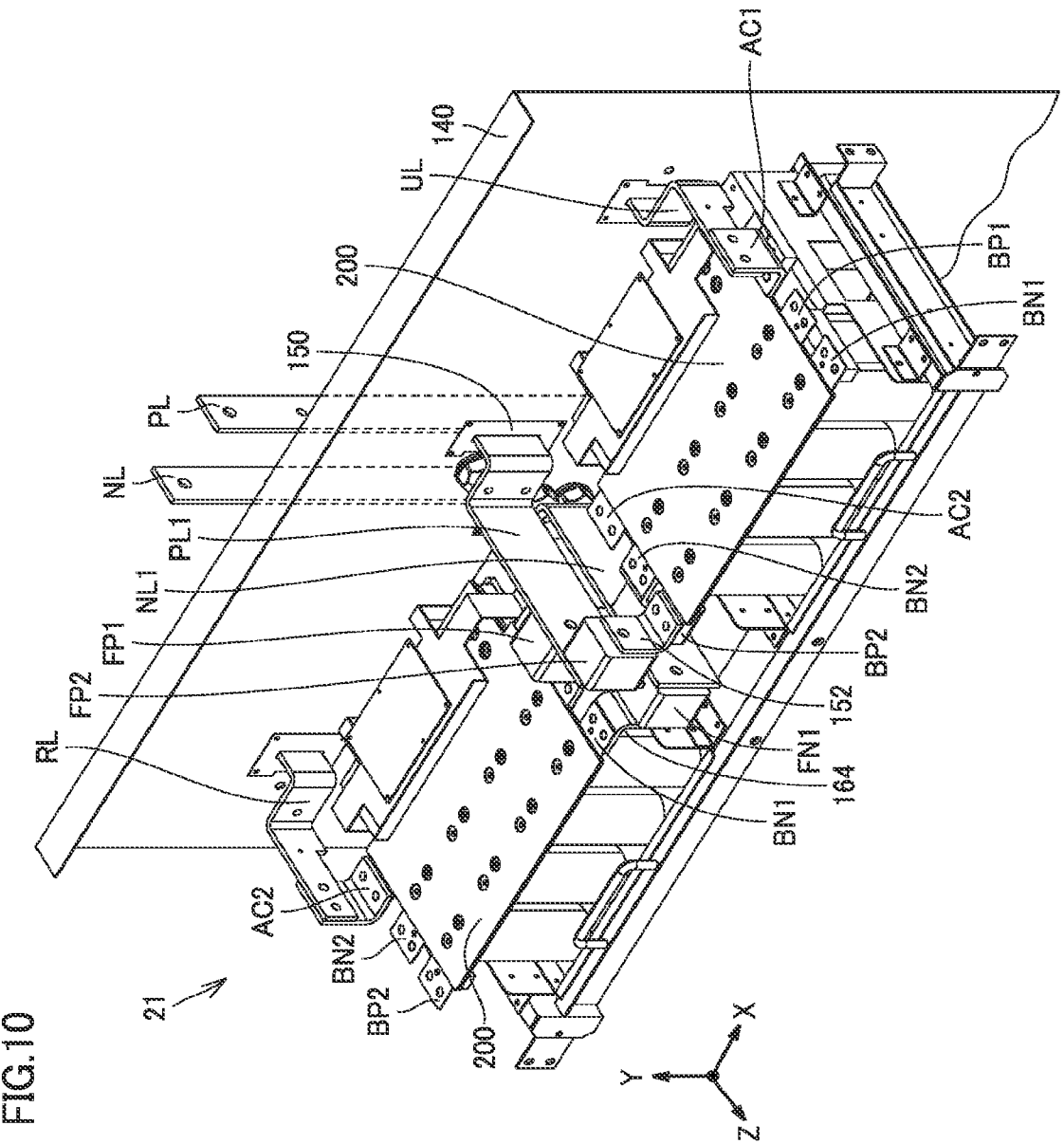
FIG. 10 is a perspective view of a power conversion unit as viewed from a first direction on the second power converter side.
Figure 11:
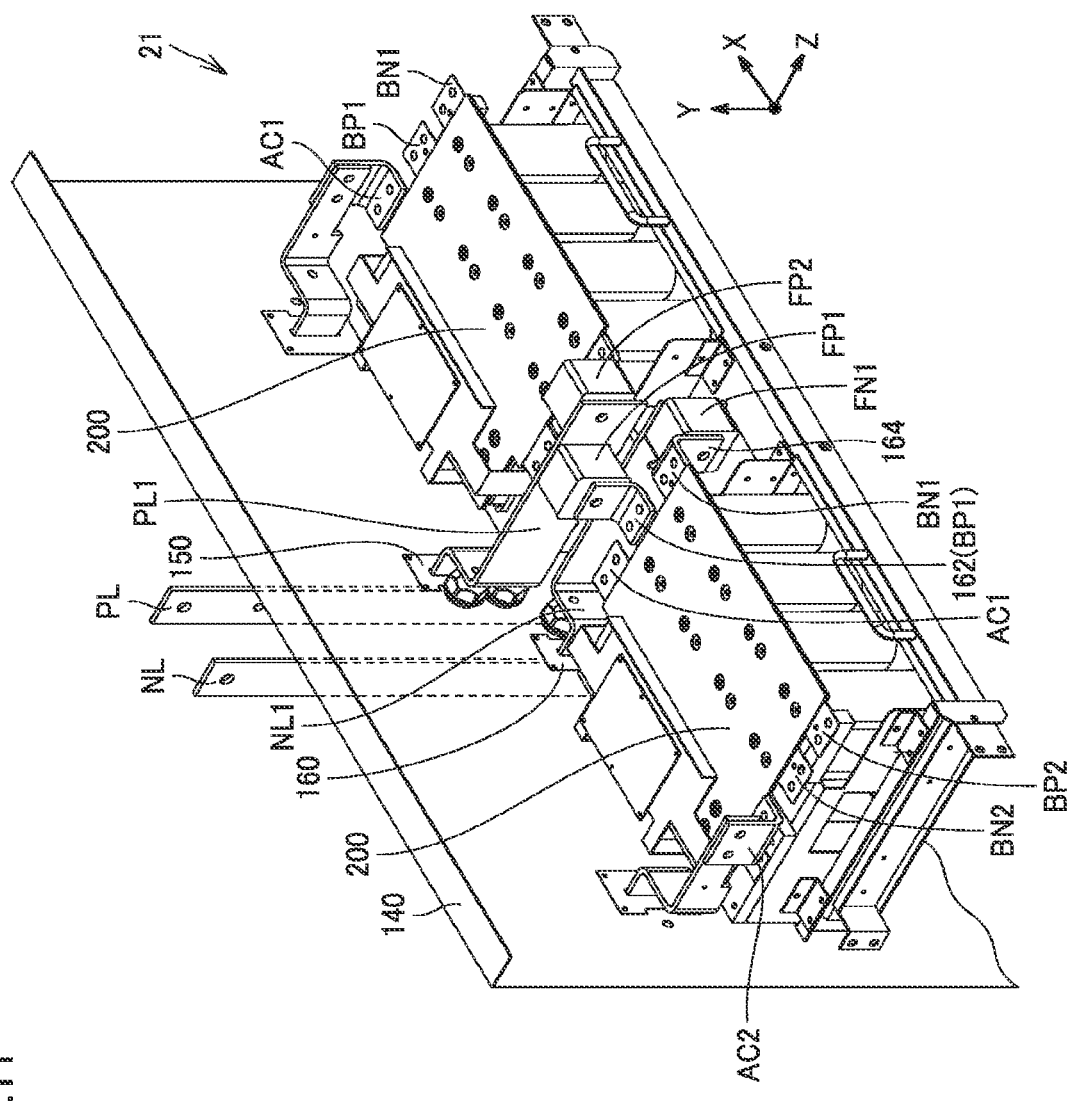
FIG. 11 is a perspective view of the power conversion unit as viewed from a second direction on the first power converter side.

As shown in FIG. 6, in a two-dimensional view as viewed from the thickness direction (Y direction), first fuse FP1 and fourth fuse FN2 are arranged in alignment in the length direction (X direction). Third fuse FN1 and second fuse FP2 are arranged in alignment in the length direction, FIG. 10 is a perspective view of power conversion unit 21 as viewed from a first direction on the second power converter 10 (inverter 2U) side. FIG. 11 is a perspective view of power conversion unit 21 as viewed from a second direction on the first power converter 10 (converter 1R) side.

As shown in FIG. 10 and FIG. 11, DC positive bus PL1 has a first conductive member having a strip-like shape extending in the width direction (Z direction). DC negative bus NL1 has a second conductive member having a strip-like shape extending in the width direction. The first conductive member and the second conductive member are arranged in alignment in the thickness direction (Y direction). The connection position of first fuse FP1 to the first conductive member is shifted from the connection position of second fuse FP2 in the width direction. The connection position of third fuse FN1 to the second conductive member is shifted from the connection position of fourth fuse FN2 in the width direction.

As shown in FIG. 5, FIG. 6, FIG. 10, and FIG. 11, four fuses FP1, FP2, FN1, and FN2 are arranged at positions such that they are not overlap each other in any of the length direction (X direction), the width direction (Z direction), and the thickness direction (Y direction). As shown in FIG. 5, therefore, when uninterruptible power supply device 100 is viewed from the width direction, all of four fuses FP1, FP2, FN1, and FN2 can be seen. This configuration enables the user to easily check whether each fuse is damaged, thereby enhancing the quality of uninterruptible power supply device 100.

When any fuse among four fuses FP1, FP2, FN1, and FN2 is damaged, the damaged fuse can be easily removed and replaced by a new fuse. The workability in installation and replacement of fuses therefore can be improved.

Further, each of DC positive bus PL1 and DC negative bus NL1 can be formed with a conductive member having a simple strip-like shape. This configuration facilitates processing and assembly of conductive members that form DC buses PL1 and NL1, thereby reducing the production cost of the power conversion device.

As described above, in laminated bus bar 200 according to the present embodiment, even when a plurality of power converters included in the power conversion device are configured with common power converters 10, the visibility of a plurality of fuses arranged in a space between adjacent two power converters and the workability in attachment thereof are ensured. The commonality of power converters thus can be achieved with a simple configuration.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1R, 1S, 1T converter, 2U, 2V, 2W inverter, 5 commercial AC power supply, 6 load, 7 battery, 9 control device, 10 power converter, 12, C1 to C3, C11 to C13 capacitor, 14, 16 DC line, 18 AC line, 21 to 23 power conversion unit, 100 uninterruptible power supply device, 110, 120, 130 stage, 140 partition plate, 152, 154, 162, 164 connection member, 200 laminated bus bar, 203 connection hole, 210 flat plate portion, 211 to 215 through hole, 220AC first conductive plate, 220P second conductive plate, 220N third conductive plate, 225 insulating plate, 300 casing, 310 first substrate, 320 cover, 330 second substrate, AC1, AC2 AC terminal, BP1, BP2 positive DC terminal, BN1, BN2 negative DC terminal, M1 to M4 semiconductor module, CD capacitor unit, PL, PL1 to PL3 DC positive bus, NL, NL1 to NL3 DC negative bus, Q1, Q2 semiconductor switching element, D1, D2 diode.

The invention claimed is:

1. A laminated bus bar for use in a power converter capable of bidirectional power conversion, the laminated bus bar comprising:

a flat plate portion having a length direction, a width direction orthogonal to the length direction, and a thickness direction orthogonal to the length direction and the width direction, the flat plate portion including
- a first conductive plate having a first AC terminal and a second AC terminal,
- a second conductive plate having a first positive DC terminal and a second positive DC terminal,
- a third conductive plate having a first negative DC terminal and a second negative DC terminal, and
- first to fourth insulating plates alternately stacked in the thickness direction for the first to third conductive plates, wherein the flat plate portion has a first end portion in the length direction of the flat plate portion and a second end portion on an opposite side to the first end portion, in the first end portion,
- the first AC terminal protrudes from the first conductive plate in the length direction,
- the first positive DC terminal protrudes from the second conductive plate in the length direction,
- the first negative DC terminal protrudes from the third conductive plate in the length direction, and
- the first AC terminal, the first positive DC terminal, and the first negative DC terminal are arranged in alignment in this order from a third end portion in the width direction of the flat plate portion toward a fourth end portion on an opposite side to the third end portion, and in the second end portion,
- the second AC terminal protrudes from the first conductive plate in the length direction,
- the second positive DC terminal protrudes from the second conductive plate in the length direction,
- the second negative DC terminal protrudes from the third conductive plate in the length direction, and
- the second AC terminal, the second negative DC terminal, and the second positive DC terminal are arranged in alignment in this order from the third end portion toward the fourth end portion of the flat plate portion.

2. The laminated bus bar according to claim 1, wherein
the first positive DC terminal and the second negative DC terminal are arranged at positions facing each other in the length direction with the flat plate portion interposed therebetween, and
the first negative DC terminal and the second positive DC terminal are arranged at positions facing each other in the length direction with the flat plate portion interposed therebetween.

3. The laminated bus bar according to claim 2, wherein the first AC terminal and the second AC terminal are arranged at positions facing each other in the length direction with the flat plate portion interposed therebetween.

4. A power converter comprising:
a semiconductor module having a first terminal, a second terminal, and an AC terminal; and
the laminated bus bar of claim 1, wherein
the flat plate portion has a plurality of through holes passing through in the thickness direction,
the first conductive plate is connected to the AC terminal of the semiconductor module at a first through hole of the plurality of through holes,
the second conductive plate is connected to the first terminal of the semiconductor module at a second through hole of the plurality of through holes, and
the third conductive plate is connected to the second terminal of the semiconductor module at a third through hole of the plurality of through holes.

5. The power converter according to claim 4, further comprising a capacitor electrically connected between the first terminal and the second terminal, wherein
the second conductive plate is connected to a positive electrode terminal of the capacitor at a fourth through hole of the plurality of through holes, and
the third conductive plate is connected to a negative electrode terminal of the capacitor at a fifth through hole of the plurality of through holes.

6. A power conversion device comprising:
a first power converter;
a second power converter; and
a stage in a shape of a flat plate, the stage having the first power converter and the second power converter mounted thereon, wherein
the first power converter includes a first semiconductor module and a first laminated bus bar connected to the first semiconductor module,
the second power converter includes a second semiconductor module and a second laminated bus bar connected to the second semiconductor module,
each of the first and second laminated bus bars is configured with the laminated bus bar of claim 1, and
the first power converter and the second power converter are arranged in alignment in the length direction such that the first end portion of the first laminated bus bar and the second end portion of the second laminated bus bar face each other in the length direction, and the respective fourth end portions are aligned in the length direction,
the power conversion device further comprising:
a DC positive bus that electrically connects the first positive DC terminal of the first laminated bus bar and the second positive DC terminal of the second laminated bus bar;
a DC negative bus that electrically connects the first negative DC terminal of the first laminated bus bar and the second negative DC terminal of the second laminated bus bar;
a first fuse connected between the first positive DC terminal of the first laminated bus bar and the DC positive bus;
a second fuse connected between the DC positive bus and the second positive DC terminal of the second laminated bus bar;
a third fuse connected between the first negative DC terminal of the first laminated bus bar and the DC negative bus; and
a fourth fuse connected between the DC negative bus and the second negative DC terminal of the second laminated bus bar, wherein
in a two-dimensional view as viewed from the width direction,
the first fuse and the second fuse are arranged in alignment in the length direction,
the third fuse is arranged in alignment with the first fuse in the thickness direction,
the fourth fuse is arranged in alignment with the second fuse in the thickness direction, and
the third fuse and the fourth fuse are arranged in alignment in the length direction.

7. The power conversion device according to claim 6, wherein in a two-dimensional view as viewed from the thickness direction, the first fuse and the fourth fuse are arranged in alignment in the length direction, and the third fuse and the second fuse are arranged in alignment in the length direction.

8. The power conversion device according to claim 6, wherein the DC positive bus includes a first conductive member in a strip-like shape extending in the width direction, the DC negative bus includes a second conductive member in a strip-like shape extending in the width direction, and the first conductive member and the second conductive member are arranged in alignment in the thickness direction.

9. The power conversion device according to claim 6, wherein the first power converter is a converter, and the second power converter is an inverter.

10. An uninterruptible power supply device comprising:

the power conversion device of claim 9; and a power storage device connected between the DC positive bus and the DC negative bus, wherein the second AC terminal of the first power converter is connected to an AC power supply, and the first AC terminal of the second power converter is connected to a load.

\* \* \* \* \*